United States Patent
Ferri (10) Patent No.: US 9,261,764 B2
(45) Date of Patent: Feb. 16, 2016

(54) OPTICALLY EFFICIENT POLARIZED PROJECTOR

(75) Inventor: John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 873 days.

(21) Appl. No.: 13/486,685

(22) Filed: Jun. 1, 2012

(65) Prior Publication Data

US 2013/0038838 A1 Feb. 14, 2013

Related U.S. Application Data

(60) Provisional application No. 61/492,815, filed on Jun. 3, 2011.

(51) Int. Cl.

| | |
|---|---|
| G03B 21/14 | (2006.01) |
| G03B 21/20 | (2006.01) |
| G03B 35/26 | (2006.01) |
| H04N 13/04 | (2006.01) |
| H04N 9/31 | (2006.01) |

(52) U.S. Cl.
CPC ............ *G03B 21/2073* (2013.01); *G03B 35/26* (2013.01); *H04N 9/3111* (2013.01); *H04N 9/3164* (2013.01); *H04N 9/3167* (2013.01); *H04N 13/0422* (2013.01); *H04N 13/0434* (2013.01); *H04N 13/0459* (2013.01)

(58) Field of Classification Search
CPC .... H04N 9/315; H04N 9/3152; H04N 9/3197
USPC .......... 353/20, 31, 37, 38, 75, 81, 84, 88, 94, 353/97, 99, 102; 359/210.2, 489.07, 359/487.05, 489.09, 489.16; 348/743–747
See application file for complete search history.

(56) References Cited

U.S. PATENT DOCUMENTS

| | | | | |
|---|---|---|---|---|
| 6,601,958 | B2 * | 8/2003 | Ito | 353/38 |
| 7,088,321 | B1 * | 8/2006 | Parker | 345/83 |
| 2003/0193649 | A1 * | 10/2003 | Seki | 353/20 |
| 2005/0219464 | A1 * | 10/2005 | Yamasaki et al. | 353/20 |
| 2006/0238720 | A1 * | 10/2006 | Lee et al. | 353/38 |
| 2011/0187998 | A1 * | 8/2011 | Kimura et al. | 353/20 |
| 2011/0292349 | A1 * | 12/2011 | Kitano et al. | 353/31 |

* cited by examiner

*Primary Examiner* — Sultan Chowdhury
(74) *Attorney, Agent, or Firm* — Michael A. Davis, Jr.; Frank D. Cimino (57) ABSTRACT

A pixel array display system which has an illumination source with a plurality of emitters in a sparse array, collimators in front of the emitters, a condenser lens downstream of the collimators, an optical homogenizing element downstream from the condenser lens, a relay lens downstream from the optical homogenizing element, a pixel array downstream from the relay lens, a rear group of lens elements of a projection lens downstream from the pixel array, a polarization converter stack downstream from the rear group of lens elements and a front group of lens elements of the projection lens downstream from the polarization converter stack, so that light from the emitters is imaged onto input apertures of the polarization converter stack.

19 Claims, 9 Drawing Sheets

OPTICALLY EFFICIENT POLARIZED PROJECTOR

CROSS-REFERENCE TO RELATED APPLICATIONS

This application claims the benefit of Provisional Application No. 61/492,815 filed Jun. 3, 2011, the entirety of which is incorporated herein by referent. Background information for this application.

FIELD OF THE INVENTION

This invention relates to the field of pixel array display systems. More particularly, this invention relates to optical systems in pixel array display systems.

BACKGROUND OF THE INVENTION

A pixel array display system may modulate light from an illumination source as a function of input image data for each pixel to produce a display. It may be desirable to provide modulated light from the pixel array which is linearly polarized, for example, to enable a three-dimensional (3D) display system which alternates polarization directions between frames. Common methods of providing polarized modulated light from a pixel array may be undesirably inefficient from an optical throughput standpoint. Adding a polarizer to a projection lens discards half of the modulated light, which may add cost and complexity to an illumination source of the display system. Providing a polarized illumination source may require all optical elements to maintain the polarization state of the illumination source, which may add cost and complexity to the optical elements. Additional background information is given in Destain U.S. Pub. No. US 2011/0298842 A1, entitled "Sparse Source Array for Display Pixel Array Illumination with Rotated Far Field Plane."

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

A pixel array display system may have a spatially distributed multiple emitter discrete illumination source. It is not necessary for light from each emitter to have any specific state of polarization. A separate collimator is disposed in front of each emitter. Collimated light from each emitter is directed by a condenser lens, preferably in a telecentric configuration, onto an entrance surface of a light pipe or other optical homogenizing element. Light from the optical homogenizer is relayed onto a pixel array which spatially and temporally modulates the light. Modulated light from the pixel array is directed onto a polarization conversion stack, which has alternating first beamsplitter polarizers and second beamsplitter polarizers combined with polarization rotators, so that an image of the emitters of the illumination source is formed at entrance surfaces of the polarization conversion stack. Unpolarized light entering the first beamsplitter polarizers may be converted to polarized light. The emitters of the illumination source, the optical homogenizer and the polarization converter stack are configured so that substantially all of the light from the emitters is imaged onto the first beamsplitter polarizers. The display system may provide a polarized light output suitable for 3D display systems.

DETAILED DESCRIPTION OF EXAMPLE EMBODIMENTS

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

A pixel array display system may have a spatially distributed multiple emitter discrete illumination source, referred to herein as a sparse source array. The emitters may be, for example, light emitting diodes (LEDs), lasers or high intensity discharge lamps, and may include integrator rods or optical fiber bundles. Each emitter may emit light of a single color or possibly multiple colors. It is not necessary for light from each emitter to have any specific state of polarization. A separate collimator is disposed downstream from each emitter. Collimated light from each emitter is directed by a condenser lens, preferably in a telecentric configuration, onto an entrance surface of a light pipe or other optical homogenizing element. Light from the optical homogenizer is relayed onto one or more pixel arrays which spatially and temporally modulates the light. Modulated light from the pixel array is directed onto a polarization conversion stack, which has alternating first beamsplitter polarizers and second beamsplitter polarizers combined with polarization rotators, so that an image of the emitters of the illumination source is formed at entrance surfaces of the polarization conversion stack. Unpolarized light entering the first beamsplitter polarizers may be converted to polarized light. The emitters of the illumination source, the optical homogenizer and the polarization converter stack are configured so that substantially all of the light from the emitters is imaged onto the first beamsplitter polarizers. The display system may provide a polarized light output suitable for 3D display systems.

For the purposes of this description, the term "substantially" as applied to structures and elements in a display system is understood to mean within tolerances which accrue during fabrication and operation of the display system. The terms "in front of" and "downstream from" as applied to a first optical element in a display system relative to a second optical element in the display system are understood to mean the first optical element is in an optical path of the display system and the first optical element is disposed to receive light from the second optical element during operation of the display system. The term "lens" is understood to mean an optical component which contains one or more lens elements.

Figure 1:
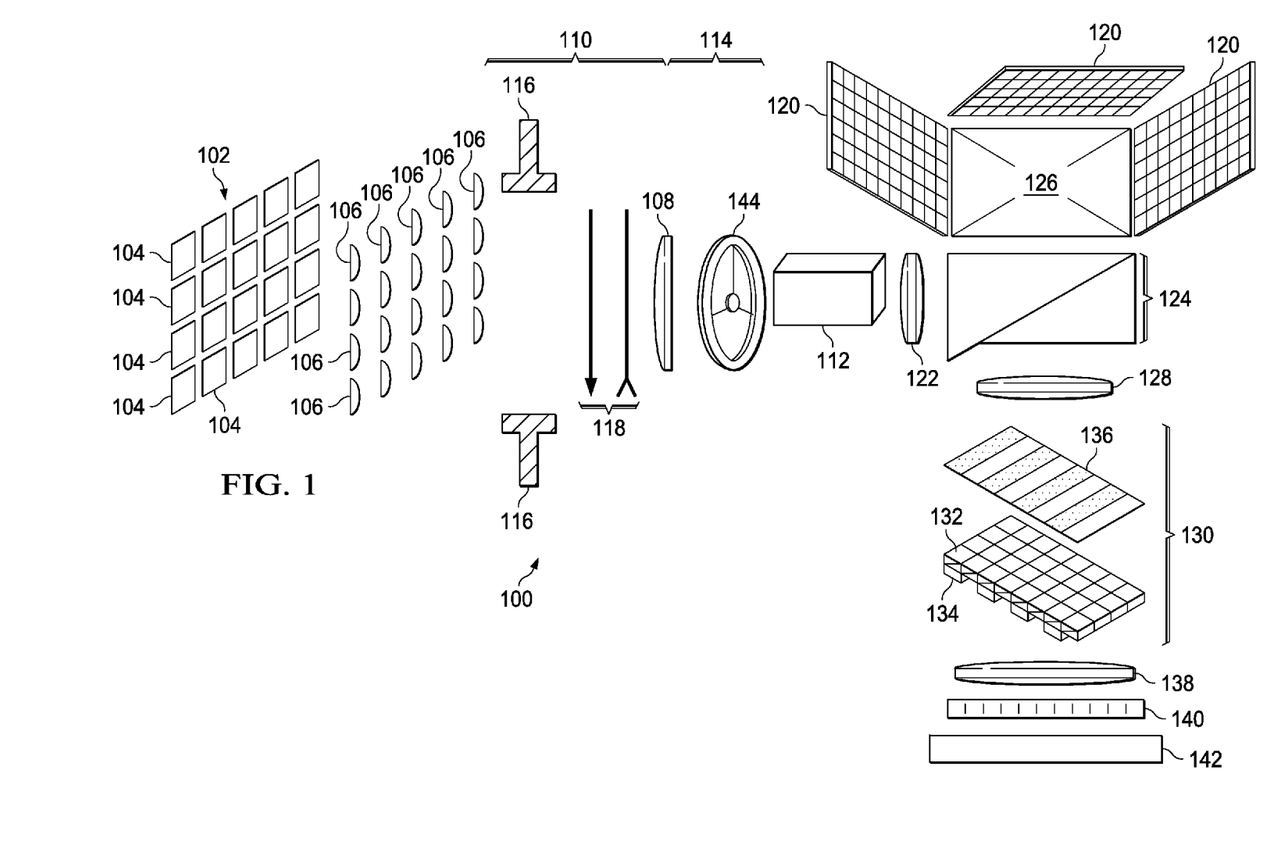
FIG. 1 depicts a pixel array display system formed according to an embodiment.

FIG. 1 depicts a pixel array display system formed according to an embodiment. The display system (100) has an illumination source (102) which includes a sparse array of emitters (104). The emitters (104) may be, for example, LEDs or lasers. The emitters (104) may include integrator rods, optical fibers or other optical elements which may increase a light emission area of the emitters (104).

In one version of the instant embodiment, every emitter (104) may emit light of a same color, for example red. In such a case, the display system (100) may include a second illumination source, not shown, with emitters which all emit light of a second color, for example, blue, and may further include a third illumination source, not shown, with emitters which all emit light of a third color, for example, green. Light from the illumination sources may be combined optically, for example with prism beamsplitters, not shown.

In another version of the instant embodiment, every instance of a first plurality of the emitters (104) may emit light of a first color, for example red, every instance of a second plurality of the emitters (104) may emit light of a second color, for example blue, and every instance of a third plurality of the emitters (104) may emit light of a third color, for example green. During operation of the display system (100), instances of the emitters (104) which emit the first color may be turned on during a first time period, while remaining emitters are not turned on during the first time period. Subsequently, instances of the emitters (104) which emit the second color may be turned on during a second time period, while remaining emitters are not turned on during the first second period, and similarly for instances of the emitters (104) which emit the third color.

In a further version of the instant embodiment, at least a portion of the emitters (104) may be operational to emit light of two or more colors, one color at a time. During operation of the display system (100), the emitters (104) may emit a first color during a first time period, a second color during a second time period, and so on.

In yet another version, the illumination source (102) may simultaneously provide light of more than one color, such as from a high intensity discharge lamp. The display system (100) may include a color wheel (144) disposed, for example, between the condenser lens (108) and the optical homogenizing element (112) so as to provide a single color of light to the pixel array (120).

A plurality of collimators (106) is disposed in front of the emitters (104) such that a separate collimator (106) is disposed in front of each emitter (104) so that light from each emitter (104) is collimated by a separate collimator (106). The collimators (106) are configured such that principal axes of the collimated light from each emitter (104) are substantially parallel to each other exiting the collimators (106). In one version of the instant embodiment, each collimator (106) may be disposed at a distance from its respective emitter (104) which is between 70 percent and 130 percent of a focal length of the collimator (106). The emitters (104) and collimators (106) are depicted in perspective in FIG. 1 to more clearly indicate their spatial configuration.

A condenser lens (108) is disposed downstream from the collimators (106) at a first distance (110) which is between 60 percent and 130 percent of a focal length of the condenser lens (108). The collimated light from each emitter (104) is directed by the condenser lens (108) onto an entrance surface of an optical homogenizing element (112) such as a light pipe. The optical homogenizing element (112) is disposed downstream from the condenser lens (108). The entrance surface of the optical homogenizing element (112) is at a second distance (114) from the condenser lens (108) which is between 85 percent and 115 percent of a back focal length of the condenser lens (108). The optical homogenizing element (112) may have, for example, parallel sides and a rectangular optical cross section.

An optional source diaphragm (116) may be disposed in an optical path of the display system (100), for example between the collimators (106) and the condenser lens (108). An optional anamorphic lens element (118) may be disposed in an optical path of the display system (100), for example between the collimators (106) and the condenser lens (108). The anamorphic lens element (118) may provide a desired aspect ratio of the collimated light from the emitters (104).

Light from the exit surface of the optical homogenizing element (112) is directed through a relay lens (122), and possibly reflection/transmission prisms (124), onto one or more pixel arrays (120). The relay lens (122) is disposed downstream from the optical homogenizing element (112), and the pixel arrays (120) are disposed downstream from the relay lens (122). In versions of the instant embodiment with two or more pixel arrays (120), beamsplitter prisms (126) may be used to direct light to the pixel arrays (120), for example directing red light to a first pixel array (120), blue light to a second pixel array (120) and green light to a third pixel array (120).

The pixel arrays (120) spatially and temporally modulate the light from the relay lens (122) and direct it toward a pixel array output optical cone. A rear group of lens elements (128) of a projection lens directs the output optical cone onto a polarization converter stack (130) disposed downstream from the rear group of lens elements (128) of the projection lens.

The polarization converter stack (130) includes an array of pairs of adjacent polarizing beamsplitters (132). A first polarizing beamsplitter (132) of a pair provides an input aperture for incoming light into the polarization converter stack (130).

A portion of the incoming light with a first polarization orientation is passed through the first polarizing beamsplitter (132) into a polarized output optical cone, with the first polarization orientation unchanged. A second portion of the incoming light into the polarization converter stack (130), having a second polarization orientation which is perpendicular to the first polarization orientation, is reflected by the first polarizing beamsplitter (132) to an adjacent second polarizing beamsplitter (132) of the pair. The second polarizing beamsplitter (132) reflects the second portion of the incoming light into a half wave plate (134) which rotates the polarization orientation of the second portion of the incoming light to the first polarization orientation and transmits the rotated second portion into the polarized output optical cone. Thus, both the first portion and the second portion of the incoming light are polarized in the first polarization orientation and transmitted into the polarized output optical cone.

Incoming light into the polarization converter stack (130) which directly enters the second polarizing beamsplitter (132) of the pair may be transmitted by the polarization converter stack (130) with the second polarization orientation. Maintaining substantially all the light in the polarized output optical cone with the first polarization orientation is accomplished by configuring the emitters (104) so as to be imaged onto the first polarizing beamsplitter (132) of each beamsplitter pair of adjacent polarizing beamsplitters (132). Exemplary configurations of the emitters (104) will be discussed in reference to subsequent figures.

The polarization converter stack (130) may further include an optional input mask (136) which reduces, by at least 50 percent, or blocks incoming light from directly entering the second polarizing beamsplitter (132) of each beamsplitter pair of adjacent polarizing beamsplitters (132). In one version of the instant embodiment, the input mask (136) may include metal thin film areas which are substantially opaque to block incoming light from directly entering the second polarizing beamsplitter (132) of each beamsplitter pair. FIG. 1 depicts the input mask (136) spatially separated from the array of pairs of adjacent polarizing beamsplitters (132) to more clearly indicate the arrangement of the polarizing beamsplitters (132). The input mask (136) may directly contact the polarizing beamsplitters (132).

The polarized light from the polarization converter stack (130) passes through a front group of lens elements (138) of the projection lens disposed in front of the polarization converter stack (130). The front group of lens elements (138) may focus the light in the polarized output optical cone onto a display screen, not shown. The display system (100) may further include an optional cleanup polarizer (140) which may desirably increase a degree of polarization of the light in the polarized output optical cone. In an alternate version of the instant embodiment, the cleanup polarizer (140) may be disposed between the polarization converter stack (130) and the front group of lens elements (138) of the projection lens.

In versions of the instant embodiment used in 3D displays, the display system (100) may also include a polarization modulator (142), disposed downstream from the polarization converter stack (130), which may vary a polarization state of light from the polarization converter stack (130) in sequential frames. In one version of the instant embodiment, the polarization modulator (142) may be disposed in front of the front group of lens elements (138) of the projection lens. In an alternate version, the polarization modulator (142) may be disposed between the polarization converter stack (130) and the front group of lens elements (138) of the projection lens.

Figure 2:
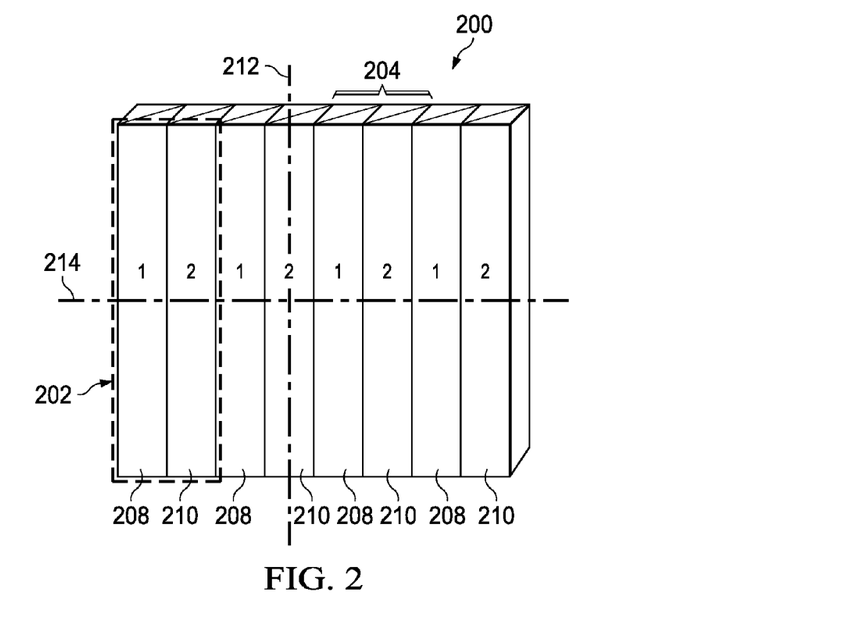
FIG. 2 depicts a first exemplary configuration of a polarization converter stack which may be used in a pixel array display system formed according to an embodiment.

FIG. 2 depicts a first exemplary configuration of a polarization converter stack which may be used in a pixel array display system formed according to an embodiment. The polarization converter stack (200) includes pairs of adjacent polarizing beamsplitters (202), configured in columns (204). The pairs (202) are outlined in a bold linewidth in FIG. 2 to more clearly indicate their spatial configuration. Each beamsplitter pair (202) includes a first polarizing beamsplitter (208), labeled with a numeral "1" on an input aperture of the first polarizing beamsplitter (208). Each beamsplitter pair (202) also includes an adjacent second polarizing beamsplitter (210), laterally adjacent to the first polarizing beamsplitter (208), labeled with a numeral "2." A polarization rotator plate, not shown, is disposed behind each instance of the second polarizing beamsplitters (210). In the instant embodiment, a vertical projection (212) of the principal axes of a homogenizing optical element, not shown, in the pixel array display system, on the polarization converter stack (200) bisects an instance of the second polarizing beamsplitters (210) in one instance of the columns (206). A horizontal projection (214) of the principal axes of the homogenizing optical element is perpendicular to the vertical projection (212). The projections (212) and (214) of the principal axes are depicted with hatched lines. Emitters in an illumination source which are used with the polarization converter stack (200) of the instant embodiment are imaged onto the input aperture of the first polarizing beamsplitters (208), labeled with numeral "1."

Figure 3:
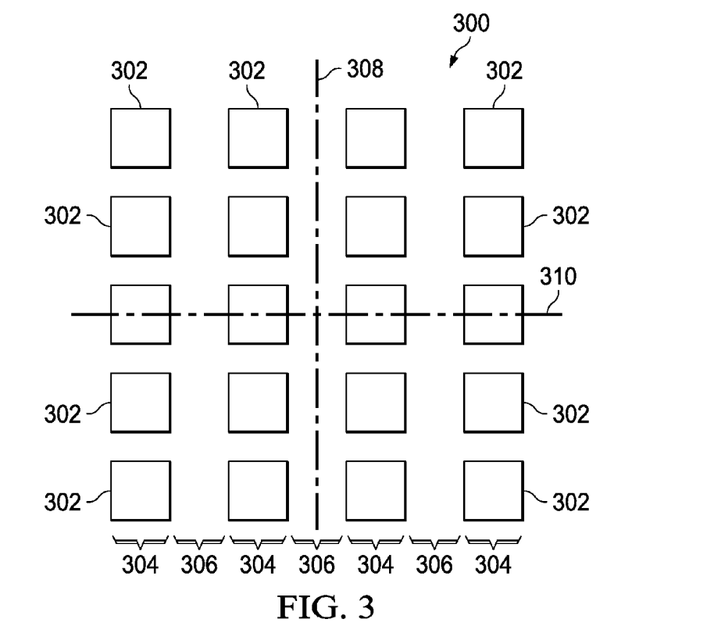
FIG. 3 depicts a first spatial configuration of emitters in an illumination source which may be used, according to an embodiment, with the polarization converter stack discussed in reference to FIG. 2.

FIG. 3 depicts a first spatial configuration of emitters in an illumination source which may be used, according to an embodiment, with the polarization converter stack discussed in reference to FIG. 2. The illumination source (300) includes a sparse array of emitters (302) which are disposed in populated columns (304) separated by empty columns (306). In the instant embodiment, a vertical projection (308) of principal axes of a homogenizing optical element, not shown, in the pixel array display system, on the sparse array of emitters (302) bisects one instance of the empty columns (306). A horizontal projection (310) of the principal axes of the homogenizing optical element may, for example, bisect instances of the emitters (302). The projections (308) and (310) of the principal axes are depicted with hatched lines.

During operation of a pixel array display system, formed according to an embodiment and containing the illumination source (300), images of light from each emitter (302) will be reflected across the projections (308) and (310) of the principal axes so as to form columns of light which may be imaged onto the input aperture of the first polarizing beamsplitter (208) in each beamsplitter pair of adjacent polarizing beamsplitters (202) in FIG. 2. Configuring the sparse array of emitters (302) to image onto the input apertures of a polarization converter stack in the pixel array display system may provide an advantageous optical efficiency of conversion of light from the emitters (302) to a desired polarization orientation.

Figure 4A:
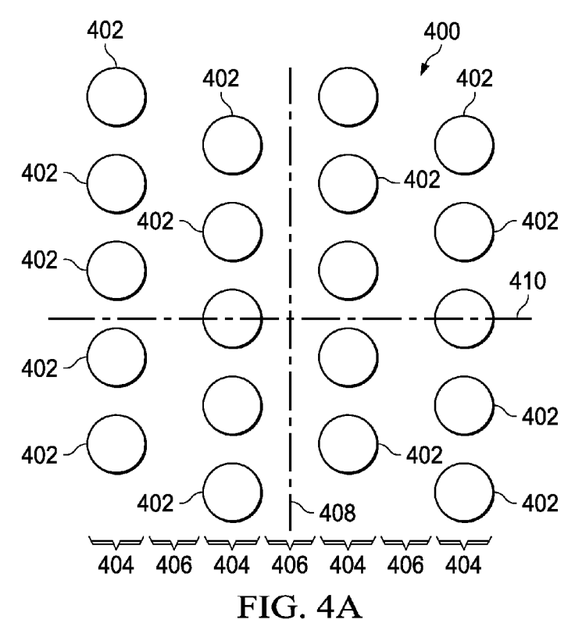
FIG. 4A and FIG. 4B depict a second spatial configuration of emitters in an illumination source which may be used, according to an embodiment, with the polarization converter stack discussed in reference to FIG. 2.
Figure 4B:
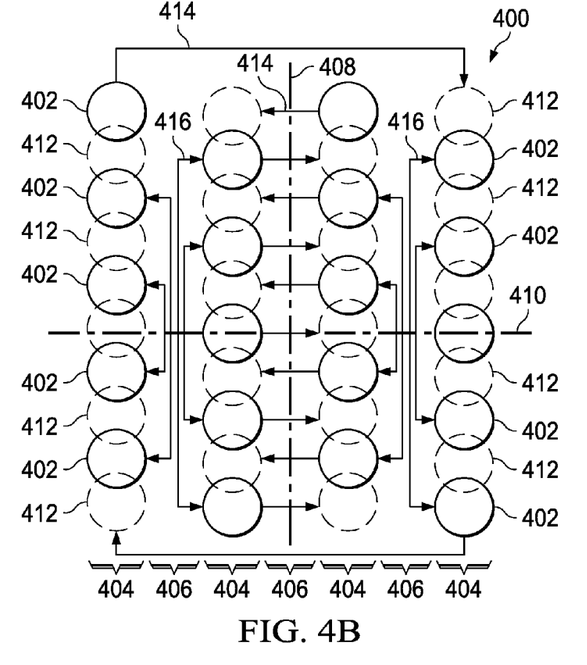

FIG. 4A and FIG. 4B depict a second spatial configuration of emitters in an illumination source which may be used, according to an embodiment, with the polarization converter stack discussed in reference to FIG. 2. Referring to FIG. 4A, the illumination source (400) includes a sparse array of emitters (402) which are disposed in offset populated columns (404) separated by empty columns (406). In the instant embodiment, a vertical projection (408) of principal axes of a homogenizing optical element, not shown, in the pixel array display system, on the sparse array of emitters (402) bisects an instance of the empty columns (406). A horizontal projection (410) of the principal axes of the homogenizing optical element may, for example, bisect instances of the emitters (402). The projections (408) and (410) of the principal axes are depicted with hatched lines.

FIG. 4B depicts the horizontal reflections (412) of the emitters (402) across the vertical projection (408) of the principal axes after passing through the homogenizing optical element; the reflections are shown in hatched line in FIG. 4B. Reflection arrows (414) indicate correspondence between emitters (402) and horizontal reflections (412). Horizontal reflections (412) fill gaps in the populated columns (404) so as to provide light to the input aperture of the first polarizing beamsplitter (208) in each beamsplitter pair of adjacent polarizing beamsplitters (202) in FIG. 2. Vertical reflections (416) also occur, and may help to fill gaps in the populated columns (404).

Figure 5A:
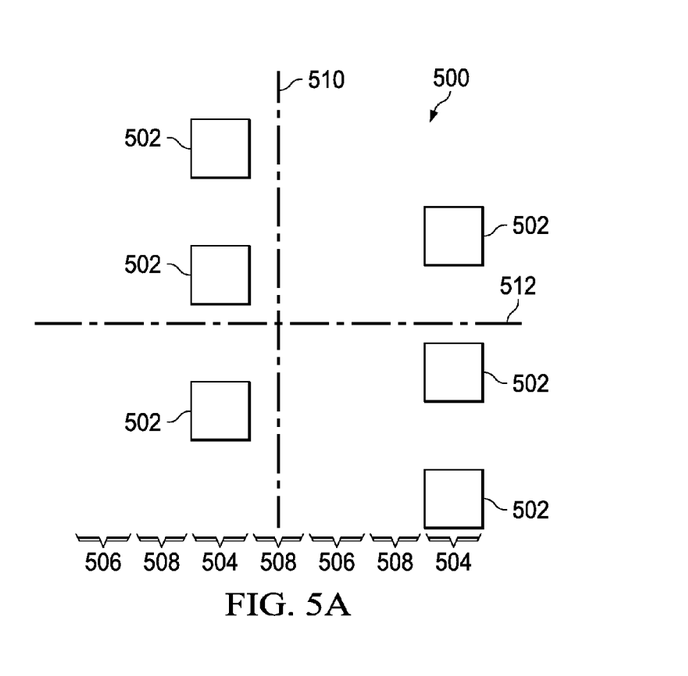
FIG. 5A and FIG. 5B depict a third spatial configuration of emitters in an illumination source which may be used, according to an embodiment, with the polarization converter stack discussed in reference to FIG. 2.
Figure 5B:
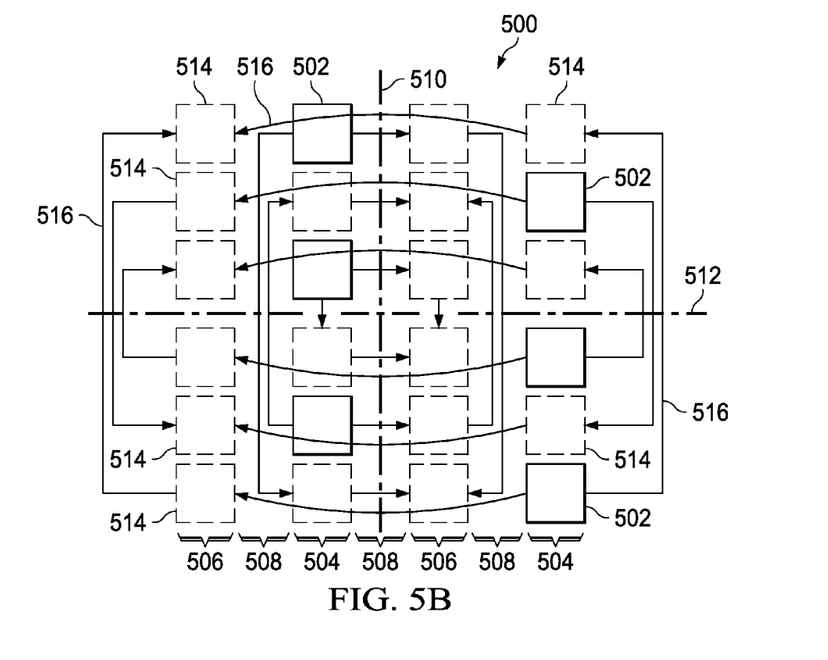

FIG. 5A and FIG. 5B depict a third spatial configuration of emitters in an illumination source which may be used, according to an embodiment, with the polarization converter stack discussed in reference to FIG. 2. Referring to FIG. 5A, the illumination source (500) includes a sparse array of emitters (502) which are disposed in alternating emitter populated columns (504) and reflection populated columns (506) which are separated from each other by empty columns (508). In the instant embodiment, a vertical projection (510) of principal axes of a homogenizing optical element, not shown, in the pixel array display system, on the sparse array of emitters (502) bisects an instance of the empty columns (508). A horizontal projection (512) of the principal axes of the homogenizing optical element may, for example, bisect instances of the emitters (502). The projections (510) and (512) of the principal axes are depicted with hatched lines.

FIG. 5B depicts the reflections (514) of the emitters (502) across the projections (510) and (512) of the principal axes after passing through the homogenizing optical element; the reflections (514) are shown in hatched line in FIG. 5B. Reflection arrows (516) indicate correspondence between emitters (502) and reflections (514). Reflections (514) fill gaps in the emitter populated columns (504) and fill in the reflection populated columns (506) so as to provide light to the input aperture of the first polarizing beamsplitter (208) in each beamsplitter pair of adjacent polarizing beamsplitters (202) in FIG. 2.

Figure 6:
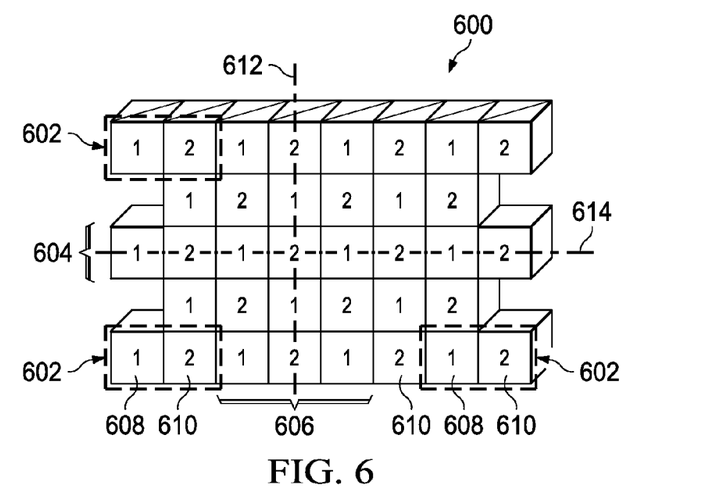
FIG. 6 depicts a second exemplary configuration of a polarization converter stack which may be used in a pixel array display system formed according to an embodiment.

FIG. 6 depicts a second exemplary configuration of a polarization converter stack which may be used in a pixel array display system formed according to an embodiment. The polarization converter stack (600) includes pairs of adjacent polarizing beamsplitters (602), configured in rows (604) and staggered columns (606). The pairs (602) are outlined in a bold linewidth in FIG. 6 to more clearly indicate their spatial configuration. Each beamsplitter pair (602) includes a first polarizing beamsplitter (608), labeled with a numeral "1" on an input aperture of the first polarizing beamsplitter (608). Each beamsplitter pair (602) also includes an adjacent second polarizing beamsplitter (610), labeled with a numeral "2." A half wave plate, not shown, is disposed behind each instance of the second polarizing beamsplitters (610). Configuring the beamsplitter pairs (602) in staggered columns (606) results in instances of the first polarizing beamsplitters (608) being laterally and vertically adjacent to instances of the second polarizing beamsplitters (610), and vice versa, so that the first polarizing beamsplitters (608) and the second polarizing beamsplitters (610) have a "checkerboard" pattern.

In the instant embodiment, a vertical projection (612) of principal axes of a homogenizing optical element, not shown, in the pixel array display system, on the polarization converter stack (600) bisects instances of the first polarizing beamsplitters (608) and instances of the second polarizing beamsplitters (610) in one instance of the staggered columns (606). A horizontal projection (614) of the principal axes of the homogenizing optical element bisects instances of the first polarizing beamsplitters (608) and instances of the second polarizing beamsplitters (610) in one instance of the rows (604). The projections (612) and (614) of the principal axes of a homogenizing optical element, not shown, on the polarization converter stack (600) are depicted with hatched lines.

Figure 7:
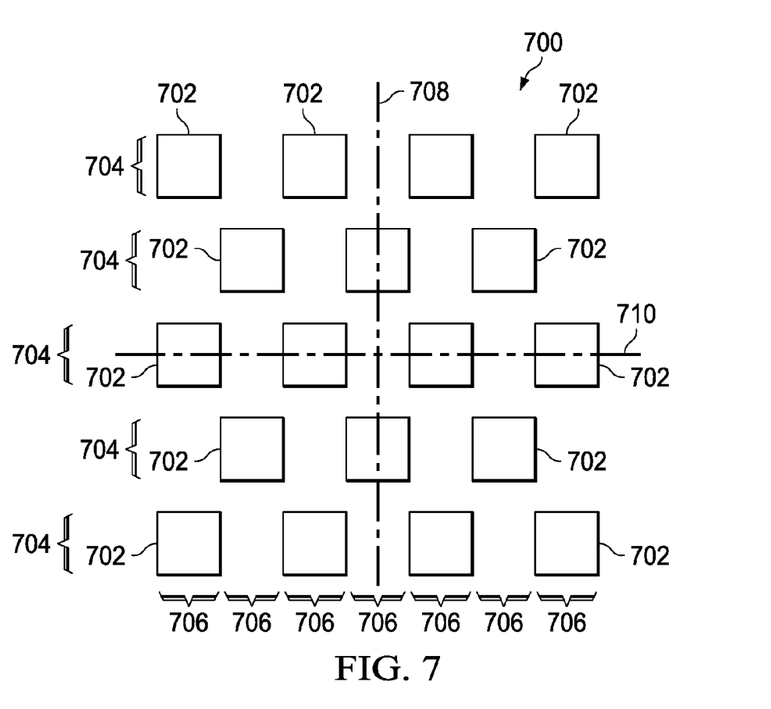
FIG. 7 depicts a fourth spatial configuration of emitters in an illumination source, which may be used, according to an embodiment, with the polarization converter stack discussed in reference to FIG. 6.

FIG. 7 depicts a fourth spatial configuration of emitters in an illumination source, which may be used, according to an embodiment, with the polarization converter stack discussed in reference to FIG. 6. The illumination source (700) includes a sparse array of emitters (702) which are configured in a checkerboard pattern, so that each row (704) of emitters (702) and each column (706) of emitters (702) has alternating emitters (702) and empty spaces.

In the instant embodiment, a vertical projection (708) of principal axes of a homogenizing optical element, not shown, in the pixel array display system, on the sparse array of emitters (702) bisects the emitters (702) in an instance of the columns (706). A horizontal projection (710) of the principal axes of the homogenizing optical element bisects the emitters (702) in an instance of the rows (704). The projections (708) and (710) of the principal axes meet in, and bisect, an empty space between emitters (702). The projections (708) and (710) of the principal axes are depicted with hatched lines.

During operation of a pixel array display system, formed according to an embodiment and containing the illumination source (700), images of light from each emitter (702) may be imaged onto the input aperture of the first polarizing beamsplitter (608) in each beamsplitter pair of adjacent polarizing beamsplitters (602) in FIG. 6. Configuring the sparse array of emitters (702) to image onto the input apertures of a polarization converter stack in the pixel array display system may provide an advantageous optical efficiency of conversion of light from the emitters (702) to a desired polarization orientation.

Figure 8A:
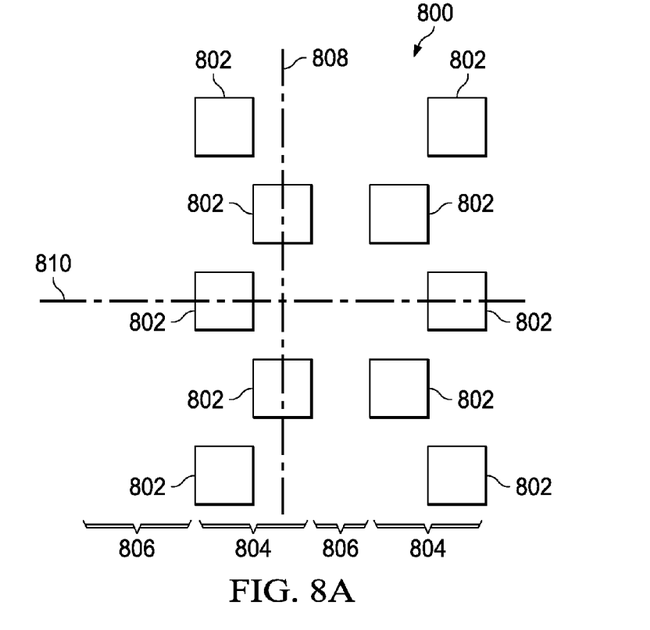
FIG. 8A and FIG. 8B depict a fifth spatial configuration of emitters in an illumination source which may be used, according to an embodiment, with the polarization converter stack discussed in reference to FIG. 6.
Figure 8B:
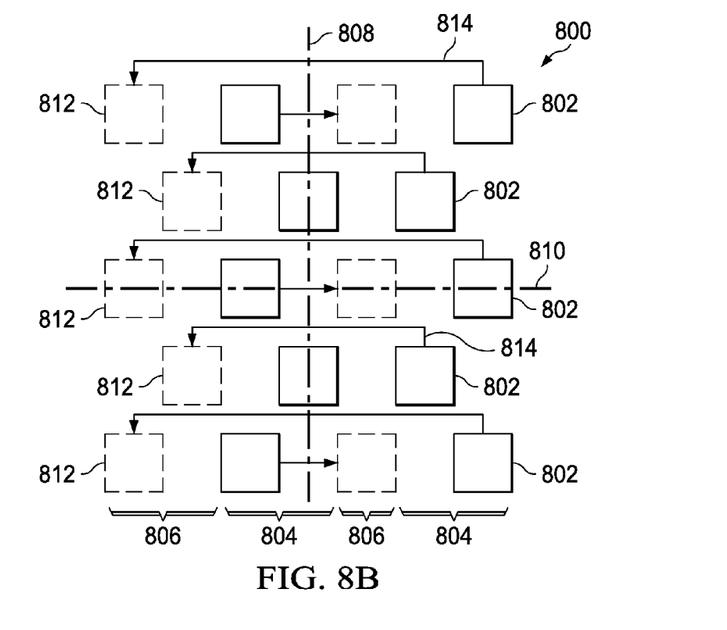

FIG. 8A and FIG. 8B depict a fifth spatial configuration of emitters in an illumination source which may be used, according to an embodiment, with the polarization converter stack discussed in reference to FIG. 6. Referring to FIG. 8A, the illumination source (800) includes a sparse array of emitters (802) which are disposed in staggered dual columns (804) separated by empty columns (806).

In the instant embodiment, a vertical projection (808) of principal axes of a homogenizing optical element, not shown, in the pixel array display system, on the sparse array of emitters (802) bisects a portion of the emitters (802) in an instance of the staggered dual columns (804). A horizontal projection (810) of the principal axes of the homogenizing optical element bisects instances of the emitters (802) and intersects the vertical projection (808) in an empty space between emitters (802). The projections (808) and (810) of the principal axes are depicted with hatched lines.

FIG. 8B depicts the reflections (812) of the emitters (802) across the vertical projection (808) of the principal axes after passing through the homogenizing optical element; the reflections are shown in hatched line in FIG. 8B. Reflection arrows (814) indicate correspondence between emitters (802) and reflections (812). Reflections (812) fill in the empty columns (806) so as to provide light to the input aperture of the first polarizing beamsplitter (608) in each beamsplitter pair of adjacent polarizing beamsplitters (602) in FIG. 6.

Figure 9:
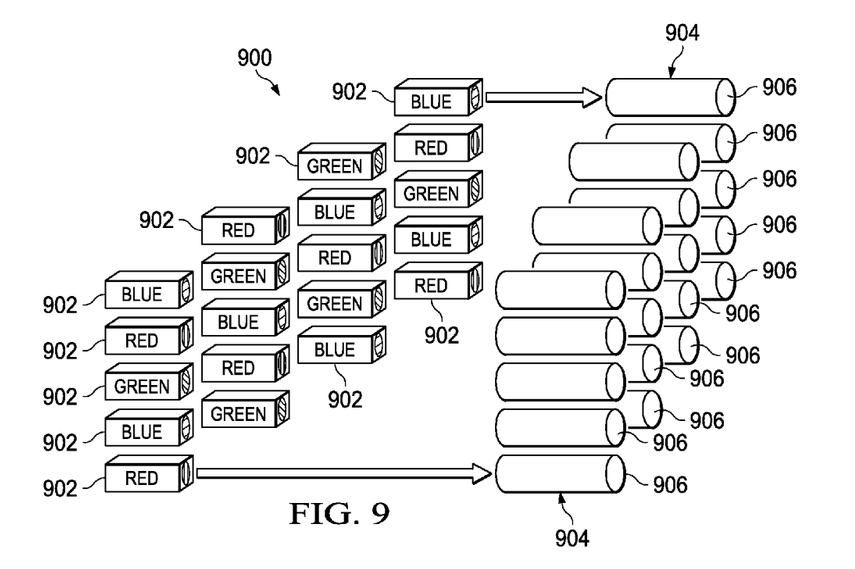
FIG. 9 through FIG. 14 depict exemplary sparse emitter arrays which may be used in pixel array display systems according to embodiments.

FIG. 9 through FIG. 14 depict exemplary sparse emitter arrays which may be used in pixel array display systems according to embodiments. Referring to FIG. 9, an illumination source (900) includes an array of lasers (902) configured in a sparse array. An array of integrator rods (904) is disposed in front of the array of lasers (902), so that one integrator rod (904) is disposed in front of each laser (902) so as to provide a desired uniformity of light at an exit surface of the integrator rod (904). Exit surfaces (906) of the integrator rods (904) provide emitters for the illumination source (900). The integrator rods (904) are configured so as to provide a desired light pattern on a polarization converter stack, not shown, in a display system containing the illumination source (900). The integrator rods (904) may be configured, for example, to provide a sparse array of emitters as described in reference to FIG. 3, FIG. 4A, FIG. 5A, FIG. 7 or FIG. 8A. In one version of the instant embodiment, instances of the lasers (902) may emit different colors. For example, a first portion of the lasers (902) may emit red light, a second portion of the lasers (902) may emit blue light, and a third portion of the lasers (902) may emit green light, as depicted in FIG. 9. During operation of the display system containing the illumination source (900), instances of the lasers (902) emitting a same color may be turned on and off in sequence with instances of lasers (902) emitting a different color. In another version of the instant embodiment, all of the lasers (902) may emit light of substantially a same color.

Figure 10:
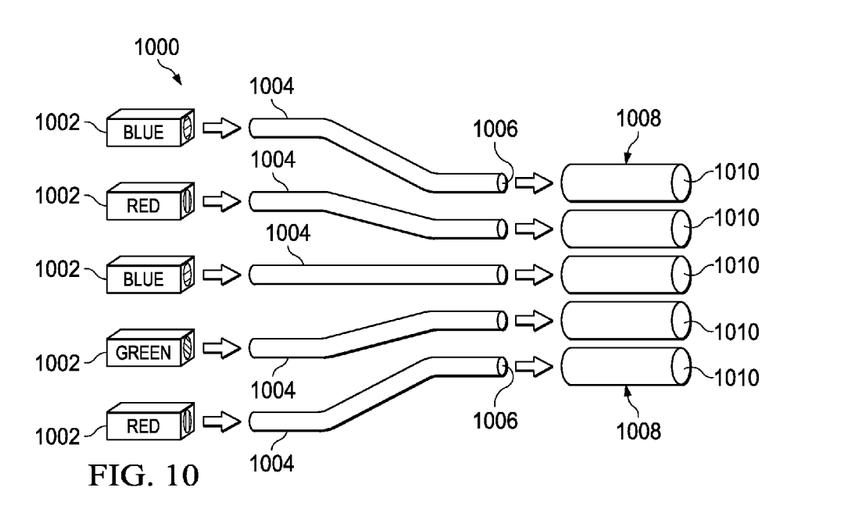

Referring to FIG. 10, an illumination source (1000) includes an array of lasers (1002) which may be spatially configured independently of a desired illumination pattern at a polarization converter stack, not shown, in a pixel array display system containing the illumination source (1000). For example, the lasers (1002) may be spatially configured to provide a desired level of heat dissipation. Optical fibers (1004) are disposed in front of the lasers (1002) so that at least one optical fiber (1004) is disposed in front of each laser (1002). Instances of the optical fibers (1004) may be single optical fibers or may include bundles of optical fibers. The optical fibers (1004) are configured so as to collect light emitted from the lasers (1002) with a desired level of optical efficiency. In one version of the instant embodiment, exit surfaces (1006) of the optical fibers (1004) may provide emitters for the illumination source (1000). The exit surfaces (1006) of the optical fibers (1004) are spatially configured so as to provide a desired light pattern on a polarization converter stack, not shown, in a display system containing the illumination source (1000).

In another version, the optical fibers (1004) are further configured so that the exit surfaces (1006) of the optical fibers (1004) provide light from the lasers (1002) to integrator rods (1008) disposed in front of the exit surfaces (1006) of the optical fibers (1004). Exit surfaces (1010) of the integrator rods (1008) provide emitters for the illumination source (1000). The exit surfaces (1010) of the integrator rods (1008) are spatially configured so as to provide a desired light pattern on a polarization converter stack, not shown, in a display system containing the illumination source (1000). FIG. 10 depicts a single column of lasers to more clearly indicate the spatial configuration of the lasers (1002), the optical fibers (1004) and the integrator rods (1008).

The illumination source (1000) may be configured, for example, to provide a sparse array of emitters as described in reference to FIG. 3, FIG. 4A, FIG. 5A, FIG. 7 or FIG. 8A. In one version of the instant embodiment, instances of the lasers (1002) may emit different colors. For example, a first portion of the lasers (1002) may emit red light, a second portion of the lasers (1002) may emit blue light, and a third portion of the lasers (1002) may emit green light, as depicted in FIG. 10. During operation of the display system containing the illumination source (900), instances of the lasers (1002) emitting a same color may be turned on and off in sequence with instances of lasers (1002) emitting a different color. In another version of the instant embodiment, all of the lasers (1002) may emit light of substantially a same color.

Figure 11:
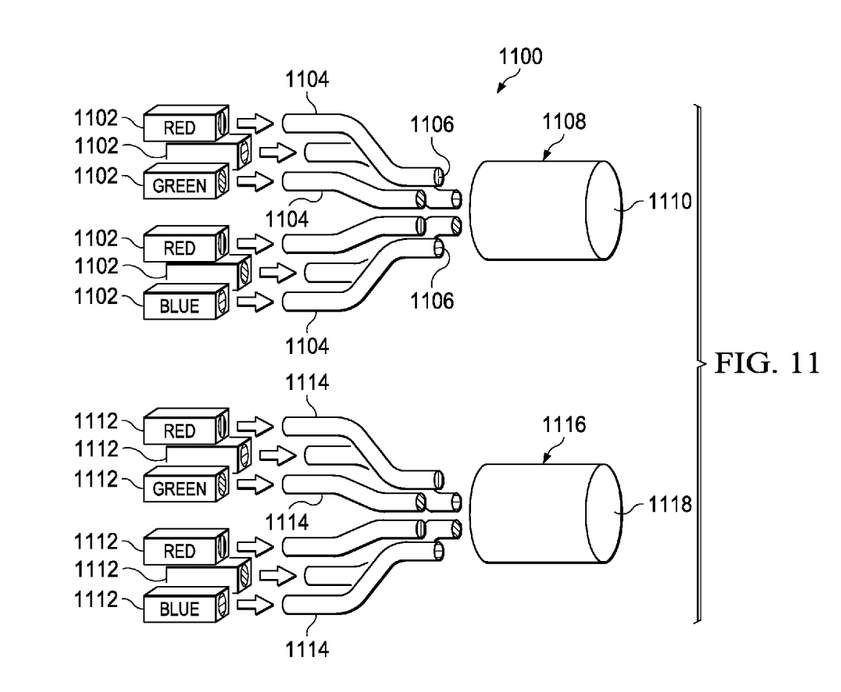

Referring to FIG. 11, an illumination source (1100) includes a first plurality of lasers (1102). A first plurality of optical fibers (1104) is disposed in front of the first plurality of lasers (1102) so that at least one optical fiber (1104) is disposed in front of each laser (1102). Instances of the optical fibers (1104) may be single optical fibers or may include bundles of optical fibers. The optical fibers (1104) are configured so as to collect light emitted from the lasers (1102) with a desired level of optical efficiency. The optical fibers (1104) are further configured so that exit surfaces (1106) of the first plurality of optical fibers (1104) provide light from the first plurality of lasers (1102) to a first integrator rod (1108), disposed in front of the exit surfaces (1106) of the first plurality of optical fibers (1104), with a desired level of optical efficiency. An exit surface (1110) of the first integrator rod (1108) provides a first emitter in a sparse array of emitters of the illumination source (1100).

The illumination source (1100) further includes a second plurality of lasers (1112), a second plurality of optical fibers (1114) and a second integrator rod (1116), similarly configured, so that an exit surface (1118) of the second integrator rod (1116) provides a second emitter in the sparse array of emitters of the illumination source (1100). The illumination source (1100) may include additional pluralities of lasers, optical fibers and integrator rods, not shown, which provide additional emitters in the sparse array of emitters.

In one version of the instant embodiment, instances of the lasers in the first plurality of lasers (1102) may emit different colors, and instances of the lasers in the second plurality of lasers (1112) may also emit different colors. For example, a first portion of the first plurality of lasers (1102) may emit red light, a second portion of the first plurality of lasers (1102) may emit blue light, and a third portion of the first plurality of lasers (1102) may emit green light, and a first portion of the second plurality of lasers (1112) may emit red light, a second portion of the second plurality of lasers (1112) may emit blue light, and a third portion of the second plurality of lasers (1112) may emit green light, as depicted in FIG. 11. During operation of the display system containing the illumination source (1100), instances of the lasers (1102) emitting a same color may be turned on and off in sequence with instances of lasers (1102) emitting a different color.

In another version of the instant embodiment, all the lasers (1102) in the first plurality of lasers (1102) may emit light of a first color, for example red, and all the lasers (1112) in the second plurality of lasers (1112) may emit light of a second color, for example blue, and so on for additional pluralities of lasers. During operation of the display system containing the illumination source (1100), instances of the lasers (1102) emitting a same color may be turned on and off in sequence with instances of lasers (1102) emitting a different color.

In a further version of the instant embodiment, all the lasers (1102) in the first plurality of lasers (1102) and all the lasers (1112) in the second plurality of lasers (1112), and additional pluralities of lasers in the illumination source (1100), may emit light of a same color.

Figure 12:
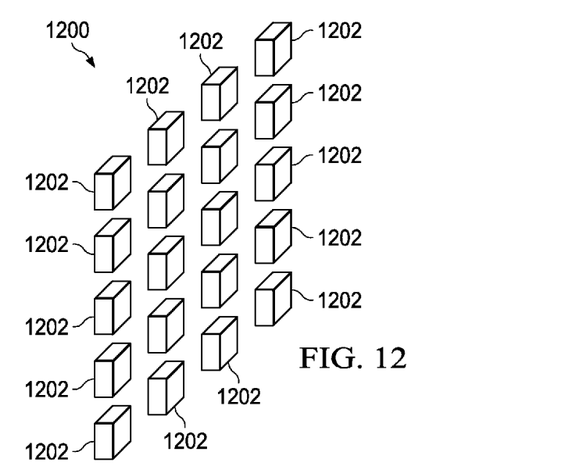

Referring to FIG. 12, an illumination source (1200) includes an array of LEDs (1202) which may be spatially configured so as to provide a desired light pattern on a polarization converter stack, not shown, in a display system containing the illumination source (1200). The illumination source (1200) may be configured, for example, to provide a sparse array of emitters as described in reference to FIG. 3, FIG. 4A, FIG. 5A, FIG. 7 or FIG. 8A. In one version of the instant embodiment, instances of the LEDs (1202) may emit different colors. For example, a first portion of the LEDs (1202) may emit red light, a second portion of the LEDs (1202) may emit blue light, and a third portion of the LEDs (1202) may emit green light. During operation of the display system containing the illumination source (900), instances of the LEDs (1202) emitting a same color may be turned on and off in sequence with instances of LEDs (1202) emitting a different color. In another version of the instant embodiment, all of the LEDs (1202) may emit light of substantially a same color.

Figure 13:
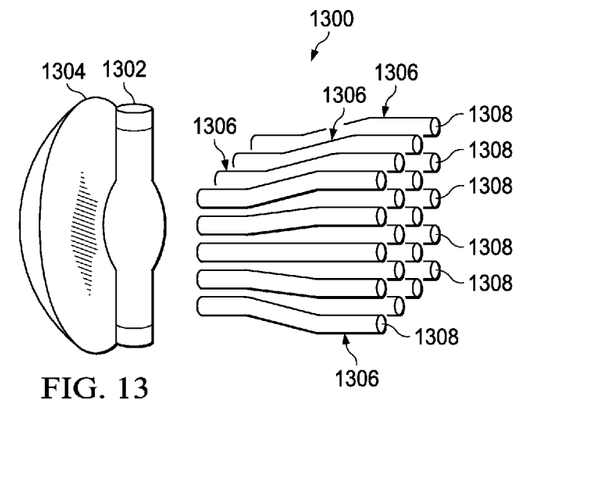

Referring to FIG. 13, an illumination source (1300) includes a high intensity arc discharge lamp (1302) and a reflector (1304) which direct light of multiple colors into an array of fiber optics (1306). Exit surfaces (1308) of the optical fibers (1306) may provide emitters for the illumination source (1300). The exit surfaces (1308) of the optical fibers (1306) are spatially configured so as to provide a desired light pattern on a polarization converter stack, not shown, in a display system containing the illumination source (1300).

Figure 14:
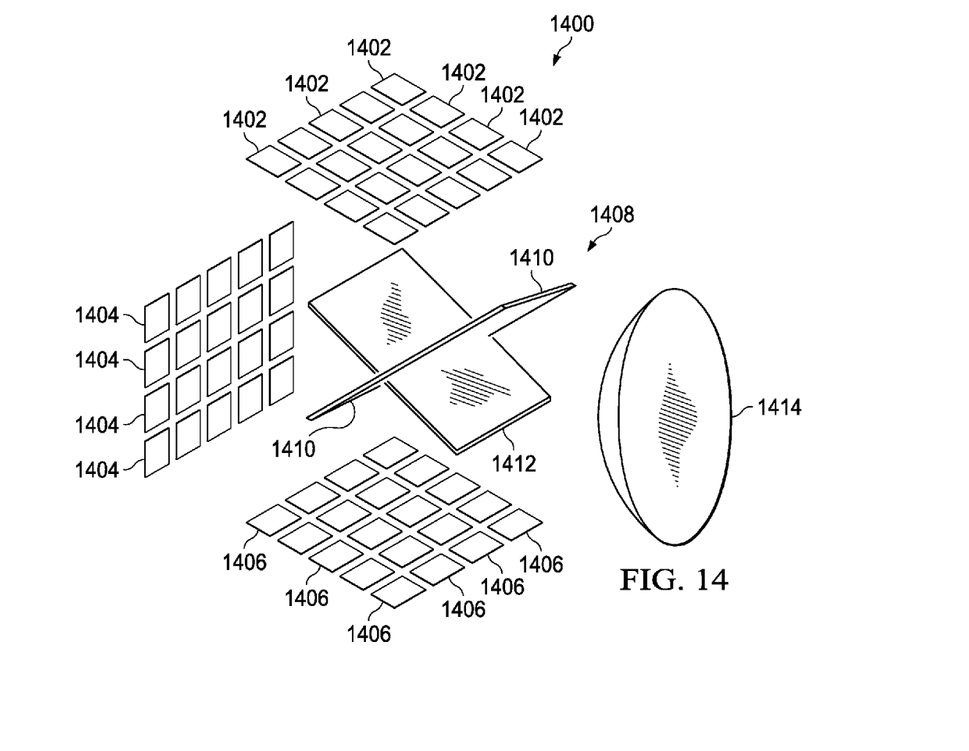

Referring to FIG. 14, an illumination source (1400) includes a first array of emitters (1402) which emit light of a first color, for example, red, a second array of emitters (1404) which emit light of a second color, for example, green, and a third array of emitters (1406) which emit light of a third color, for example, blue. The first array of emitters (1402), the second array of emitters (1404), and the third array of emitters (1406) are disposed around a crossed dichroic filter (1408) which includes a first dichroic filter element (1410) and a second dichroic filter element (1412). A condenser lens (1414) is disposed in front of the crossed dichroic filter (1408). During operation of a display system containing the illumination source (1400), light from the first array of emitters (1402) is transmitted through the first dichroic filter element (1410) and reflected off the second dichroic filter element (1412) into the condenser lens (1414). Light from the second array of emitters (1404) is transmitted through the first dichroic filter element (1410) and transmitted through the second dichroic filter element (1412) into the condenser lens (1414). Light from the third array of emitters (1406) is transmitted through the second dichroic filter element (1412) and reflected off the first dichroic filter element (1410) into the condenser lens (1414). Each of the first array of emitters (1402), the second array of emitters (1404), and the third array of emitters (1406) are spatially configured so as to provide a desired light pattern on a polarization converter stack, not shown, in a display system containing the illumination source (1400).

It will be recognized that the emitters described in reference to FIG. 9 through FIG. 14 may have square, rectangular, circular, ellipsoidal, hexagonal, octagonal or other shapes.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A display system, comprising:
an illumination source containing a plurality of emitters spatially configured in a sparse array;
a plurality of collimators disposed in front of said emitters, such that each emitter has a separate instance of said collimators is disposed in front thereof;
a condenser lens disposed downstream from said plurality of collimators;
an optical homogenizing element disposed downstream from said condenser lens;
a relay lens disposed downstream from said optical homogenizing element;
a pixel array disposed downstream from said relay lens;
a rear group of lens elements of a projection lens disposed downstream from said pixel array;
a polarization converter stack disposed downstream from said rear group of lens elements of said projection lens, said polarization converter stack having input apertures; and
a front group of lens elements of said projection lens disposed in front of said polarization converter stack;
wherein said condenser lens, said optical homogenizing element, said relay lens, and said rear group of lens elements of said projection lens are configured to image light from said emitters onto said input apertures of said polarization converter stack;
and wherein:
said polarization converter stack includes an array of pairs of adjacent polarizing beamsplitters;
a first polarizing beamsplitter of each pair of adjacent polarizing beamsplitters provides an instance of said input apertures; and
said polarization converter stack further includes an input mask which reduces, by at least 50 percent, light from directly entering a second polarizing beamsplitter of each pair of adjacent polarizing beamsplitters.

2. The display system of claim 1, wherein:
said condenser lens is disposed at a first distance from said plurality of collimators, said first distance being between 60 percent and 130 percent of a focal length of the condenser lens; and
said optical homogenizing element is disposed at a second distance from an entrance surface of said optical homogenizing element, said second distance being between 85 percent and 115 percent of a back focal length of the condenser lens.

3. The display system of claim 1, wherein said input apertures of said polarization converter stack are disposed at an image plane of said collimators.

4. The display system of claim 1, wherein each instance of said collimators is disposed at a distance from its respective said emitter which is between 70 percent and 130 percent of a focal length of said instance of said collimators.

5. The display system of claim 1, further including a cleanup polarizer disposed between said polarization converter stack and said front group of lens elements of said projection lens.

6. The display system of claim 1, further including a polarization modulator disposed in front of said polarization converter stack, said polarization modulator being operational to vary a polarization state of light from said polarization converter stack in sequential frames of said display system.

7. A display system, comprising:
an illumination source containing a plurality of emitters spatially configured in a sparse array;
a plurality of collimators disposed in front of said emitters, such that a separate instance of said collimators is disposed in front of each of said emitters;
a condenser lens disposed downstream from said plurality of collimators;
an optical homogenizing element disposed downstream from said condenser lens;

a relay lens disposed downstream from said optical homogenizing element;
a pixel array disposed downstream from said relay lens;
a rear group of lens elements of a projection lens disposed downstream from said pixel array;
a polarization converter stack disposed downstream from said rear group of lens elements of said projection lens, said polarization converter stack having input apertures; and
a front group of lens elements of said projection lens disposed in front of said polarization converter stack;
wherein said condenser lens, said optical homogenizing element, said relay lens, and said rear group of lens elements of said projection lens are configured to image light from said emitters onto said input apertures of said polarization converter, wherein:
said polarization converter stack includes pairs of adjacent polarizing beamsplitters, said pairs being configured in rows and columns;
a first polarizing beamsplitter of each pair of adjacent polarizing beamsplitters provides an instance of said input apertures;
a second polarizing beamsplitter of each pair of adjacent polarizing beamsplitters is disposed laterally adjacent to said first polarizing beamsplitter of said pair;
instances of said first polarizing beamsplitters are vertically adjacent to other instances of said first polarizing beamsplitters; and
a vertical projection of principal axes of said optical homogenizing element on said polarization converter stack bisects instances of said second polarizing beamsplitters in one of said columns of said pairs of adjacent polarizing beamsplitters.

8. The display system of claim 7, wherein:
said emitters in said sparse array of said illumination source are disposed in populated columns separated by empty columns; and
a vertical projection of principal axes of said homogenizing optical element on said sparse array of said emitters bisects one instance of said empty columns.

9. The display system of claim 7, wherein:
said emitters in said sparse array of said illumination source are disposed in offset populated columns separated by empty columns;
a vertical projection of principal axes of said homogenizing optical element on said sparse array of said emitters bisects one instance of said empty columns; and
reflections of said emitters across said vertical projection of said principal axes after passing through said homogenizing optical element fill gaps in said populated columns.

10. The display system of claim 7, wherein:
said emitters in said sparse array of said illumination source are disposed in alternating emitter populated columns and reflection populated columns which are separated from each other by empty columns, said reflection populated columns being free of said emitters;
a vertical projection of principal axes of said homogenizing optical element on said sparse array of said emitters bisects one instance of said empty columns; and
reflections of said emitters across said vertical projection of said principal axes after passing through said homogenizing optical element; fill gaps in said populated columns and fill in said reflection populated columns.

11. A display system, comprising:
an illumination source containing a plurality of emitters spatially configured in a sparse array;
a plurality of collimators disposed in front of said emitters, such that a separate instance of said collimators is disposed in front of each of said emitters;
a condenser lens disposed downstream from said plurality of collimators;
an optical homogenizing element disposed downstream from said condenser lens;
a relay lens disposed downstream from said optical homogenizing element;
a pixel array disposed downstream from said relay lens;
a rear group of lens elements of a projection lens disposed downstream from said pixel array;
a polarization converter stack disposed downstream from said rear group of lens elements of said projection lens, said polarization converter stack having input apertures; and
a front group of lens elements of said projection lens disposed in front of said polarization converter stack;
wherein said condenser lens, said optical homogenizing element, said relay lens, and said rear group of lens elements of said projection lens are configured to image light from said emitters onto said input apertures of said polarization converter stack, wherein:
said polarization converter stack includes pairs of adjacent polarizing beamsplitters, said pairs being configured in rows and staggered columns;
a first polarizing beamsplitter of each pair of adjacent polarizing beamsplitters provides an instance of said input apertures;
a second polarizing beamsplitter of each pair of adjacent polarizing beamsplitters is disposed laterally adjacent to said first polarizing beamsplitter of said pair;
instances of said first polarizing beamsplitters are laterally and vertically adjacent to instances of said second polarizing beamsplitters, and instances of said second polarizing beamsplitters are laterally and vertically adjacent to instances of said first polarizing beamsplitters, so that said first polarizing beamsplitters and said second polarizing beamsplitters have a checkerboard pattern;
a vertical projection of principal axes of said optical homogenizing element on said polarization converter stack bisects instances of said first polarizing beamsplitters and instances of said second polarizing beamsplitters in one instance of said staggered columns of said pairs of adjacent polarizing beamsplitters; and
a horizontal projection of said principal axes of said homogenizing optical element bisects instances of said first polarizing beamsplitters and instances of said second polarizing beamsplitters in one instance of said rows of said pairs of adjacent polarizing beamsplitters.

12. The display system of claim 11, wherein:
said emitters in said sparse array of said illumination source are disposed in rows and columns with said emitters being configured in a checkerboard pattern, so that each said row of said emitters and each said column of said emitters has alternating instances of said emitters and empty spaces;
a vertical projection of principal axes of said homogenizing optical element on said sparse array of said emitters bisects said emitters in one instance of said columns;
a horizontal projection of said principal axes of said homogenizing optical element on said sparse array of said emitters bisects said emitters in one instance of said rows; and
said vertical projection and said horizontal projection of said principal axes meet in, and bisect, an empty space between said emitters.

13. The display system of claim 11, wherein:
said emitters in said sparse array of said illumination source are disposed in staggered dual columns separated by empty columns;
a vertical projection of principal axes of said homogenizing optical element on said sparse array of said emitters bisects a portion of said emitters in one instance of said staggered dual columns; and
a horizontal projection of said principal axes of said homogenizing optical element on said sparse array of said emitters bisects instances of said emitters and intersects said vertical projection in an empty space between said emitters.

14. The display system of claim 1, wherein said illumination source includes:
an array of lasers configured in the sparse array; and
an array of integrator rods disposed in front of said array of said lasers, so that one of said integrator rods is disposed in front of each of said lasers, and exit surfaces of said integrator rods provide said emitters of said illumination source.

15. The display system of claim 14, wherein:
a first portion of said array of lasers emits red light;
a second portion of said array of lasers emits blue light; and
a third portion of said array of lasers emits green light.

16. The display system of claim 1, wherein said illumination source includes:
a plurality of lasers;
optical fibers disposed in front of said lasers so that at least one of said optical fibers is disposed in front of each said laser,
an array of integrator rods disposed in front of exit surfaces of said optical fibers, so that one of said integrator rods is disposed in front of each of said exit surfaces of said optical fibers, and exit surfaces of said integrator rods provide said emitters of said illumination source.

17. The display system of claim 16, wherein:
a first portion of said array of lasers emits red light;
a second portion of said array of lasers emits blue light; and
a third portion of said array of lasers emits green light.

18. The display system of claim 1, wherein said illumination source includes:
a first plurality of lasers;
a first plurality of optical fibers disposed in front of said first plurality of lasers, so that at least one of said optical fiber of said first plurality of optical fibers is disposed in front of each said laser of said first plurality of lasers;
a first integrator rod disposed in front of exit surfaces of said first plurality of said optical fibers, so that an exit surface of said first integrator rod provides a first instance of said emitters of said illumination source;
a second plurality of lasers;
a second plurality of optical fibers disposed in front of said second plurality of lasers, so that at least one of said optical fiber of said second plurality of optical fibers is disposed in front of each said laser of said second plurality of lasers; and
a second integrator rod disposed in front of exit surfaces of said second plurality of said optical fibers, so that an exit surface of said second integrator rod provides a second instance of said emitters of said illumination source.

19. The display system of claim 18, wherein:
at least one laser of said first plurality of lasers emits red light;
at least one laser of said first plurality of lasers emits blue light;
at least one laser of said first plurality of lasers emits green light;
at least one laser of said second plurality of lasers emits red light;
at least one laser of said second plurality of lasers emits blue light; and
at least one laser of said second plurality of lasers emits green light.

* * * * *